United States Patent [19]

Ungnadner et al.

[11] 4,325,523

[45] Apr. 20, 1982

[54] FILM ADVANCING ARRANGEMENT

[75] Inventors: Peter Ungnadner, Unterhaching; Peter Blöckinger, Neuried; Friedrich Winkler, Unterhaching; Peter Lermann, Naring, all of Fed. Rep. of Germany

[73] Assignee: AGFA-Gevaert Aktiengesellschaft, Leverkusen, Fed. Rep. of Germany

[21] Appl. No.: 150,408

[22] Filed: May 13, 1980

[30] Foreign Application Priority Data

May 16, 1979 [DE] Fed. Rep. of Germany ....... 2919710

[51] Int. Cl.³ .......................... G03B 1/04; G11B 15/32
[52] U.S. Cl. ...................................... 242/205; 242/201
[58] Field of Search ...................... 242/68.3, 197, 201, 242/205, 180; 352/72, 73

[56] References Cited

U.S. PATENT DOCUMENTS 3,583,655  6/1971  Roman ................................. 242/197
3,877,656  4/1975  Suzaki ................................. 242/68.3

Primary Examiner—Leonard D. Christian
Attorney, Agent, or Firm—Michael J. Striker

[57] ABSTRACT

A film advancing arrangement for a film projector having an optical system and two spools between which a film is advanced, comprises two spool supports for carrying a supply spool and a takeup spool respectively. The spool supports are pivotally mounted with respect to the housing of the projector to be positioned inside of the housing or outside of the housing so that the spools of small standard diameters may be located within the contours of the housing and the spools of large standard diameters may be mounted on the same spool supports and located outside of the housing.

9 Claims, 4 Drawing Figures

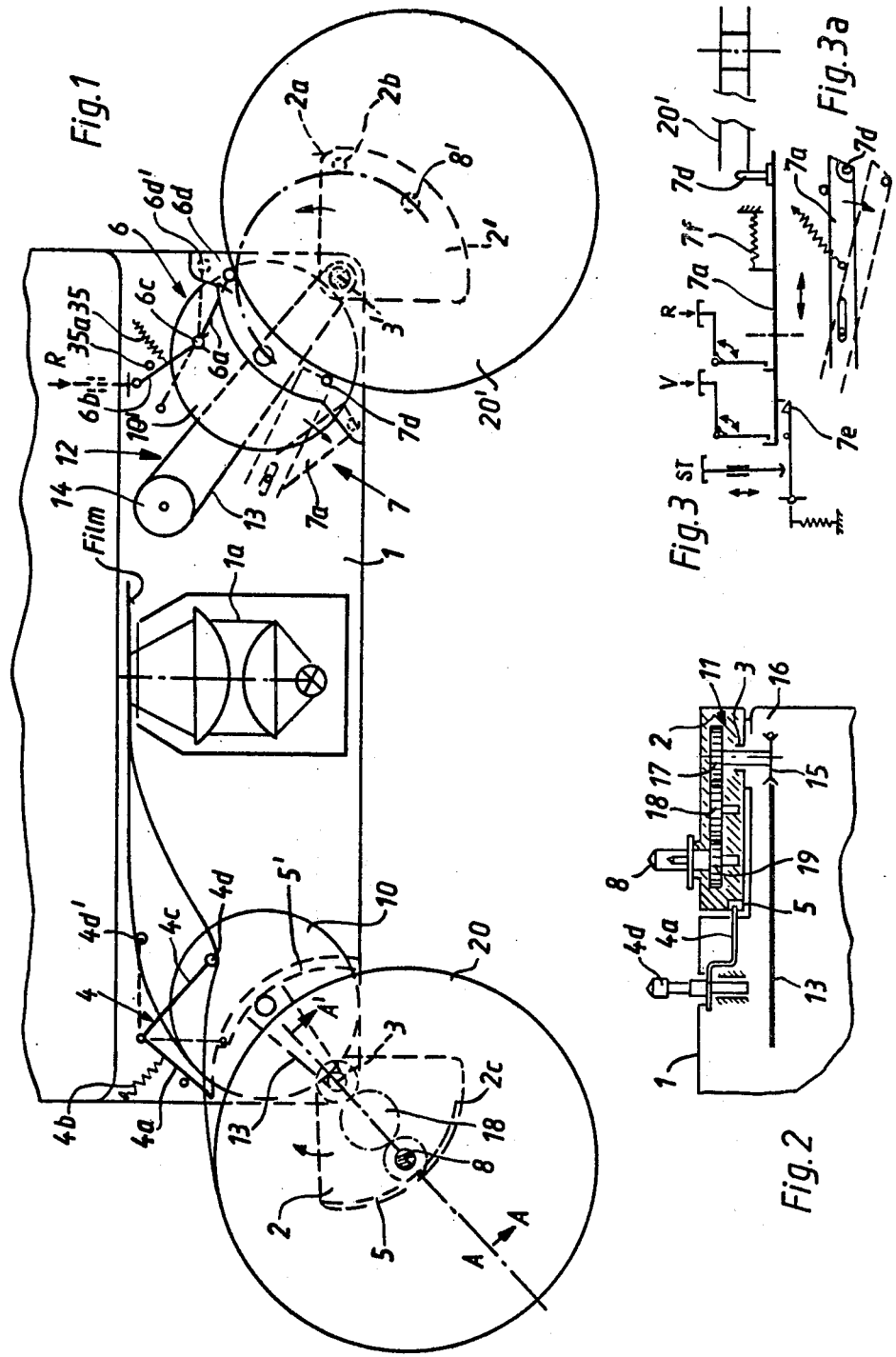

FILM ADVANCING ARRANGEMENT

BACKGROUND OF THE INVENTION

This invention relates to film projectors having an optical system and a pair of spools between which a film to be projected is advanced. More particularly the invention relates to advancing arrangements having support elements to support rotatable film spools where a first spool is a film supply spool and a second spool is a film takeup spool.

In the known film projectors of the foregoing type it is rather difficult to use the film spools of different sizes in one relatively compact film projector. For using the film spools with a capacity greater than 15 m (such as standard 120-m spools) and with a capacity smaller than 15 m in one projector special suitable arrangements disposed outside of the projector housing are utilized. This increases the size of the film projector even in case when the film spools of a greater capacity are not needed.

SUMMARY OF THE INVENTION

It is therefore an object of the invention to provide an improved film advancing arrangement.

Another object of the invention is to provide a relatively compact film projector having a film advancing arrangement suitable for the film spools of the relatively smaller diameters and for the film spools of the greater diameters.

Still another object of the invention resides in that the same spool support may be used for either a small size spool or large size spool.

These and other objects of the invention are attained by a film advancing arrangement for a film projector having a housing and an optical system, the arrangement comprises two spool supports each having an axis for carrying a supply spool and a takeup spool respectively, the spool supports are pivotally movable with respect to the housing of the projector so that the spools mounted on the axles are disposed inside of the housing when the spools of smaller diameters are utilized and the spools are positioned outside of the housing when the spools of greater diameters are used in the projector.

The spool supports may be formed as sectors and their axles of rotation disposed at the remote corners of the housing of the projector.

The arrangement may be provided with adjusting means for arresting the spool supports within the housing when the spools of smaller diameters are utilized.

The adjusting means of the invention have a two-linked member pivotally mounted in the housing and having a first lever with a pin which is arranged to engage a cammed surface formed on each of the spool supports. The pin of the first lever abuts against an end of the cammed surface when the spool support reaches its final position inside of the housing.

A second lever of the two-linked member which is used for the takeup spool is formed with a pin which is arranged to direct a film to be projected toward the takeup spool in its either inside or outside position.

Drive means for the axles of rotation of the film spools are provided in the arrangement which include a belt system and a gearing drive connected thereto.

A brake means may be provided to control pivoting movement of the spool support for carrying the supply spool.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a schematic view of a film advancing arrangement according to the invention;

FIG. 2 is a partial sectional view taken along line A—A' of FIG. 1;

FIG. 3 is a schematic view of a hand manipulating start-stop device shown in connection with a brake lever; and FIG. 3a is a schematic view of the brake lever.

DETAILED DESCRIPTION OF THE INVENTION

Referring to the drawings and in particular to FIG. 1, a film advancing arrangement for a film projector includes a housing 1 and an optical system 1a mounted thereon. Pivoting pins 3 and 3' are disposed at the bottom corners of the housing 1 which carry spool supports 2 and 2'. Each spool support is formed as a sector-shaped element which is pivotally supported on the pivot pin 3 or 3', respectively to rotate through 180° so that the spool support can be located within the housing to support a spool of a smaller diameter or outside of the housing 1 to support a spool of a greater diameter selectively. The standard spools of the capacities 12 m to 120 m with corresponding diameters may be used in the projector of the foregoing type. The optical system 1a of the film projector is disposed between a supply spool 10' and a takeup spool 10 of smaller diameters or a supply spool 20' and a takeup spool 20 of greater diameters. In order to rotate the supply and takeup spools during the operation a gearing 11 is provided for each spool which is shown in FIG. 2.

Each axis of rotation 8 or 8' for the film spools is arranged on the pivotable spool support 2, 2'. A belt system denoted 12 and having a belt 13 is arranged on pulleys 14 and 15 of which the pulley 15 is connected to an axis 16 at an end of which a gear 17 is mounted. The gear 17 is in mesh with a gear 18 which in turn is in mesh with a gear 19 carrying an outwardly extending axis 8 to support the takeup spool. The identical belt system, and the gearing are arranged to provide the rotation of the supply spools. The dimensions of the spool supports 2, 2' are so chosen that the takeup and supply spools of relatively smaller sizes are completely located within the housing 1 and remain within the housing during the operation thereby providing a compact construction. The spool supports 2 and 2' are so constructed that they are arrested after reaching their final position in either position inside of the housing or outside of the housing.

In order to arrest the spool support 2 for holding the spool 10 of a smaller size in its final position after the support 2 has been pivoted toward the housing and positioned therein a two-linked adjustment member 4 having levers 4a, 4c is provided which is pivotally supported on an axis and biased by a spring 4b. A lower end of the lever 4c is formed with a pin 4d whereas the support 2 is provided with a cammed surface 5 shown by dotted lines. When the support 2, upon the pivoting, enters the housing the pin 4d engages the cammed surface 5 and slides along the latter unless the pin abuts against an end 2c of the cam surface to hold the support 2 in a stationary position. The final position of the levers 4a and 4c are shown in FIG. 1 in dotted lines. The second lever 3b of the two-linked member 4 is provided at a free end thereof with the pin 4d which serves to guide a film during operation towards either the spool of the smaller diameter disposed within the housing of the spool of the greater diameter located outside of the housing 1. In case the outside spool is utilized in the projector the two-linked element serves only as a guide member.

The spool support 2' for the supply spool when used for the spools of the smaller standard diameters is supported within of the housing 1 by means of a brake arrangement 6 having a two-portion lever 6a, 6b pivotally mounted in the housing on an axis 6c and operatively connected to a reverse device denoted R to control the pivoting movement of the support 2'. The lever 6a, 6b is biased by a spring 35 and terminated with a pin 35a whereas the support 2' is provided with a cammed surface 2a which is engaged by the pin 6d when the support 2' is positioned within the contours of the housing 1. The rotation of the lever 6a, 6b from the position shown by a solid line to the position shown by a dotted line when a pin 6d abuts against the surface 2a becomes effective when a reversed action caused, for example by hand is initiated.

Another embodiment 7 of the brake arrangement having a brake lever 7a is shown by dotted lines in the right corner of FIG. 1, in FIG. 3 and 3a. A pin 2b is mounted on the support 2' which engages the brake lever 7a when the support 2' used for a spool of a small standard diameter, which needs no brake takes a position within the housing 1.

When the support 2' is turned out for a spool of a great diameter, as shown in the FIGURES, the brake-pin 7d, which corresponding to brake-pin 6d is in contact with the periphery of the spool 20'. As shown in FIG. 3a, the lever 7a is biased by a spring 7f. By pressing down the R or V the lever 7a is moved to the left and the brake-pin 7d is removed from the spool 20'. In the left position the lever 7a is locked by a pawl 7e, which may be released by pressing down the key ST. The keys are not shown in FIG. 1.

It will be understood that each of the elements described above, or two or more together, may also find a useful application in other types of a film advancing arrangement differing from the types described above.

While the invention has been illustrated and described as embodied in a film advancing arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A film advancing arrangement for a film projector of the type having a housing and an optical system, comprising a first spool support having an axis for carrying a supply spool and a second spool support having an axis for carrying a takeup spool, said spool supports being pivotally movable from an outside position to an inside position with respect to the housing of the projector so that spools mounted on said axes be disposed inside of said housing when spools of small diameters are utilized and the spools be positioned outside of said housing when spools of large standard diameters are used in the projector; two pivots mounted at lower corners of said housing and connected to said supports, respectively to provide said pivoting of said supports through 180° between the inside and outside positions; and first adjusting means and second adjusting means to arrest said first support and said second support, respectively in their stationary positions within said housing when said supports reach their final positions for operation with the spools of small diameters.

2. The arrangement of claim 1, wherein each of said adjusting means include a two-linked member pivotally mounted in said housing and having a first lever terminated with a first pin and a second lever, and each of said supports being formed with a cammed surface having an abutting end, said first pin engaging said cammed surface upon said pivoting movement of said support from the outside position into the inside position and stopping said support when the first pin is in abutting relation with said end.

3. The arrangement of claim 2, wherein said second lever of said second adjusting means is provided with a second pin disposed at a free end thereof to guide a film from the optical system to the takeup spool when either the spool of a small diameter or the spool of a large diameter is used in operation.

4. The arrangement of claim 3, further comprising first drive means and second drive means for rotating said axles for carrying the supply spool and the takeup spool respectively.

5. The arrangement of claim 4, wherein each of said drive means include a belt system and a gearing system connected thereto, said gearing system being operatively connected to said axis.

6. The arrangement of claim 5, wherein said gearing system of each drive means is mounted in the corresponding spool support.

7. The arrangement of claim 6, wherein each of said spool supports is formed as a sector having an axis of rotation which coincides with a single one of said pivots.

8. The arrangement of claim 7, further comprising brake means to control pivoting movement of said spool support for carrying the supply spool.

9. The arrangement of claim 8, wherein said brake means include a brake arm pivotally mounted in said housing and a pin rigidly mounted on said first support for carrying the supply spool, said pin being arranged to engage said brake arm when said first support is in said inside position.

* * * * *